United States Patent
Li et al.

(10) Patent No.: US 12,283,167 B2
(45) Date of Patent: Apr. 22, 2025

(54) INDOOR MONITORING METHOD, DEVICE, AND SYSTEM, STORAGE MEDIUM AND CAMERA DEVICE

(71) Applicants: Gree Electric Appliances, Inc. of Zhuhai, Guangdong (CN); Leayun Technology Co., Ltd. of Zhuhai, Guangdong (CN)

(72) Inventors: Shaobin Li, Guangdong (CN); Miao Yang, Guangdong (CN); Haoxin Huang, Guangdong (CN); Jie Tang, Guangdong (CN); Daoyuan Chen, Guangdong (CN)

(73) Assignees: Gree Electric Appliances, Inc. of Zhuhai, Guangdong (CN); Leayun Technology Co., Ltd. of Zhuhai, Guangdong (CN)

( * ) Notice: Subject to any disclaimer, the term of this patent is extended or adjusted under 35 U.S.C. 154(b) by 155 days.

(21) Appl. No.: 17/924,083

(22) PCT Filed: Dec. 28, 2020

(86) PCT No.: PCT/CN2020/140010
§ 371 (c)(1),
(2) Date: Nov. 8, 2022

(87) PCT Pub. No.: WO2021/238194
PCT Pub. Date: Dec. 2, 2021

(65) Prior Publication Data
US 2023/0206736 A1    Jun. 29, 2023

(30) Foreign Application Priority Data
May 25, 2020   (CN) .......................... 202010453472.8

(51) Int. Cl.
*G08B 13/196* (2006.01)
*H04N 23/611* (2023.01)
(Continued)

(52) U.S. Cl.
CPC . *G08B 13/19608* (2013.01); *G08B 13/19689* (2013.01); *H04N 23/611* (2023.01); *H04N 23/667* (2023.01); *H04N 23/695* (2023.01)

(58) Field of Classification Search
CPC ........ G08B 13/19608; G08B 13/19689; G08B 13/196; H04N 23/611; H04N 23/667; H04N 23/695; H04N 7/183; H04N 7/18
(Continued)

(56) References Cited

U.S. PATENT DOCUMENTS 11,501,492 B1 * 11/2022 Li ............................. G06T 7/55
11,544,924 B1 *  1/2023 Lee ................. G08B 13/19608
(Continued)

FOREIGN PATENT DOCUMENTS

CN    104811595    7/2015
CN    105203093    12/2015
(Continued)

OTHER PUBLICATIONS

International Search Report and Written Opinion in International Application. No. PCT/CN2020/140010, dated Mar. 8, 2021, 14 pages (with English Translation).
(Continued)

*Primary Examiner* — Helen Shibru
(74) *Attorney, Agent, or Firm* — Fish & Richardson P.C.

(57) ABSTRACT

The disclosure relates to the field of intelligent home, and particularly to an indoor monitoring method, device and system, a storage medium and a camera device. The method includes: controlling a camera device to acquire monitoring images at consecutive times in a room; identifying a first
(Continued)

---

S5 — In response to a first control instruction preset by a user being received, controlling the camera device to enter a first preset working mode to control the camera device to acquire the monitoring images at the consecutive times in the room S14 — Acquiring, by the camera device, the monitoring images in the room at preset time intervals S15 — Controlling the camera device to enter a second preset working mode from the first preset working mode in response to the monitoring images acquired at two adjacent times being identical monitoring image at a previous time and a second monitoring image at a current time, and identifying items corresponding to the first monitoring image and the second monitoring image and positions of the items, respectively; determining whether a position of an item changes according to the position of the item in the first monitoring image and the position of the item in the second monitoring image; and generating item record information of the item when it is determined that the position of the item changes, wherein the item record information represents movement of the item in the room. In this way, the item record information helps the user to record the relevant information of the item, so as to ensure that the user can quickly find the corresponding item.

11 Claims, 5 Drawing Sheets

(51) Int. Cl.
*H04N 23/667* (2023.01)
*H04N 23/695* (2023.01)

(58) Field of Classification Search
USPC .......................................................... 386/152
See application file for complete search history.

(56) References Cited

U.S. PATENT DOCUMENTS

| | | | |
|---|---|---|---|
| 11,734,882 B2* | 8/2023 | Fleischman | G06V 20/647 |
| | | | 345/419 |
| 11,922,591 B2* | 3/2024 | Fleischman | G06F 3/04815 |
| 12,045,951 B2* | 7/2024 | Hutchcroft | G06V 10/26 |
| 2010/0134611 A1 | 6/2010 | Naruoka et al. | |
| 2018/0350093 A1 | 12/2018 | Sweet et al. | |
| 2019/0035104 A1 | 1/2019 | Cuban et al. | |
| 2021/0152750 A1* | 5/2021 | Wakamatsu | G02B 7/08 |

FOREIGN PATENT DOCUMENTS

| | | |
|---|---|---|
| CN | 106926247 | 7/2017 |
| CN | 107544387 | 1/2018 |
| CN | 108806142 | 11/2018 |
| CN | 109614897 | 4/2019 |
| CN | 109961074 | 7/2019 |
| CN | 109993045 | 7/2019 |
| CN | 111159452 | 5/2020 |
| CN | 111565301 | 8/2020 |

OTHER PUBLICATIONS

Extended European Search Report in European Appln No. 20937414.9, dated Sep. 20, 2023, 9 pages.
Office Action in Chinese Appln. No. 202010453472.8, dated Dec. 2, 2020, 20 pages (with English translation).

* cited by examiner

INDOOR MONITORING METHOD, DEVICE, AND SYSTEM, STORAGE MEDIUM AND CAMERA DEVICE

CROSS-REFERENCE TO RELATED APPLICATIONS

This application is a U.S. National Phase application under 35 U.S.C. § 371 of International Patent Application No. PCT/CN2020/140010, filed on Dec. 28, 2020, which claims priority to Chinese Patent Application No. 202010453472.8 filed before the China National Intellectual Property Administration (CNIPA) on May 25, 2020, the disclosure of which is hereby incorporated by reference in its entirety.

TECHNICAL FIELD

The disclosure relates to the technical field of intelligent home, and in particular to an indoor monitoring method, device and system, a storage medium and a camera device.

BACKGROUND

In order to monitor the indoor situation, camera devices are usually installed in residences, shops and other places, which are set to acquire indoor images or videos to implement indoor monitoring.

At present, because there are many items in a room, or the items have been placed for a long time, it may be difficult for residents to find the items that they want to find in a room with many items, or it is difficult to find the items placed a long time ago. Furthermore, the camera devices in related technologies only acquire indoor images or videos. Therefore, there is a technical problem that it is difficult for users to find items through camera devices in related technologies.

SUMMARY

To solve the technical problem that it is difficult for a user to find items through a camera device, the disclosure provides an indoor monitoring method, device and system, a storage medium and a camera device to help the user record relevant information of the items, so as to ensure that the user can quickly find corresponding items.

In a first aspect, the present disclosure provides an indoor monitoring method, which includes: controlling a camera device to acquire monitoring images at consecutive times in a room;
  identifying a first monitoring image at a previous time and a second monitoring image at a current time, and identifying items corresponding to the first monitoring image and the second monitoring image and positions of the items, respectively;
  determining whether a position of an item changes according to the position of the item in the first monitoring image and the position of the item in the second monitoring image; and
  generating item record information of the item when it is determined that the position of the item changes, wherein the item record information represents movement of the item in the room.

In some implementations, the item record information includes at least an initial position of the item, a current position of the item and an item name, wherein the initial position of the item is a position of the item identified according to the first monitoring image, and the current position of the item is a position of the item identified according to the second monitoring image.

In some implementations, before the controlling a camera device to acquire monitoring images at consecutive times in a room, the method further includes:
  in response to a first control instruction preset by a user being received, controlling the camera device to enter a first preset working mode to control the camera device to acquire the monitoring images at the consecutive times in the room.

In some implementations, after generating item record information of the item when it is determined that the position of the item changes, the method further includes:
  receiving a second control instruction input by a user, wherein the second control instruction includes a search request for searching for an item;
  acquiring item record information corresponding to the second control instruction; and
  generating a prompting instruction according to the item record information.

In some implementations, before the controlling a camera device to acquire monitoring images at consecutive times in a room, the method further includes:
  in response to a third control command preset by a user being received, controlling the camera device to enter a second preset working mode;
  when a sound signal acquired by a sound acquisition device is received, controlling the camera device to acquire an image corresponding to the sound signal;
  identifying a person in the image corresponding to the sound signal; and
  in response to the person not matching a preset person, controlling the camera device to rotate to track the person and acquire monitoring images of the person.

In some implementation, the method further includes:
  In response to there being an item identified in the first monitoring image and not identified according to the second monitoring image, determining that the item is missing, and generating an alarm instruction.

In some implementations, after in response to a first control instruction preset by a user being received, the controlling the camera device to enter a first preset working mode to control the camera device to acquire the monitoring images at the consecutive times in the room, the method further includes:
  acquiring, by the camera device, the monitoring images in the room at preset time intervals; and
  controlling the camera device to enter a second preset working mode from the first preset working mode in response to the monitoring images acquired at two adjacent times being identical.

In a second aspect, the disclosure further provides an indoor monitoring device, which includes: an image acquisition module, an identification module and a processing module,
  wherein the image acquisition module is configured to control a camera device to acquire monitoring images at consecutive times in a room;
  the identification module is configured to identify a first monitoring image at a previous time and a second monitoring image at a current time, and identify items corresponding to the first monitoring image and the second monitoring image and positions of the items, respectively; and
  the processing module is configured to: determine whether a position of an item changes according to the position of the item in the first monitoring image and the position of the item in the second monitoring image, and generate item record information of the item when it is determined that the position of the item changes, wherein the item record information represents movement of the item in the room.

In a third aspect, the disclosure further provides an indoor monitoring system, which includes: a camera device and a processor, wherein the camera device is electrically connected with the processor, and configured to acquire monitoring images at consecutive times in a room and send the monitoring images to the processor; and the processing module is configured to: determine whether a position of an item changes according to the position of the item in the first monitoring image and the position of the item in the second monitoring image, and generate item record information of the item when it is determined that the position of the item changes, wherein the item record information represents movement of the item in the room.

In some implementation, the indoor monitoring system further includes a sound acquisition device, wherein the sound acquisition device is electrically connected with the processor, and configured to acquire a sound signal and send the signal to the processor; and the processor is configured to, when the sound signal acquired by the sound acquisition device is received, control the camera device to acquire an image corresponding to the sound signal.

In a fourth aspect, the disclosure further provides a storage medium having stored thereon computer program instructions that, when executed by one or more processors, cause the processors to perform the indoor monitoring method according to the first aspect.

In a fifth aspect, the disclosure further provides a camera device, including a processor and a memory having stored thereon a computer program, wherein when the computer program is executed by the processor, the indoor monitoring method according to the first aspect is performed.

The disclosure provides an indoor monitoring method, device and system, a storage medium and a camera device. The method includes: controlling a camera device to acquire monitoring images at consecutive times in a room; identifying a first monitoring image at a previous time and a second monitoring image at a current time, and identifying items corresponding to the first monitoring image and the second monitoring image and positions of the items, respectively; determining whether a position of an item changes according to the position of the item in the first monitoring image and the position of the item in the second monitoring image; and generating item record information of the item when it is determined that the position of the item changes, wherein the item record information represents movement of the item in the room. In this way, the item record information helps the user to record the relevant information of the item, so as to ensure that the user can quickly find the corresponding item.

BRIEF DESCRIPTION OF DRAWINGS

Hereinafter, the disclosure will be described in more detail based on embodiments and with reference to the accompanying drawings.

Figure 1:
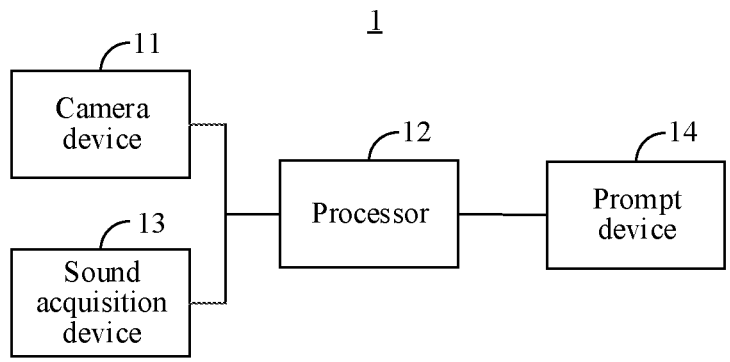
FIG. 1 is a logic block diagram of an indoor monitoring system provided by an embodiment of the disclosure.

Reference numbers: 1—indoor monitoring system; 11—camera device; 12—processor; 13—sound acquisition device; 14—prompt device; 2—indoor monitoring device; 21—image acquisition module; 22—identification module; 23—processing module.

In the drawings the same parts use the same reference numerals and the drawings are not drawn according to actual scales.

DETAILED DESCRIPTION

The implementations of the disclosure will be described in detail with reference to the accompanying drawings and embodiments, so that the realization process of how to apply technical means to solve technical problems and achieve corresponding technical effects in the disclosure can be fully understood, and the embodiments of the disclosure can be implemented. The embodiment of the disclosure and various features in the embodiments can be combined with each other on the premise of no conflict, and the formed technical schemes are within the protection scope of the disclosure.

First Embodiment

Based on the above technical problems existing in the related technology, this embodiment provides an indoor monitoring system. FIG. 1 is a logic block diagram of an indoor monitoring system provided by the embodiment of the disclosure. As shown in FIG. 1, the indoor monitoring system 1 includes a camera device 11, a processor 12, a sound acquisition device 13 and a prompt device 14. The camera device 11, the sound acquisition device 13 and the prompt device 14 are all electrically connected to the processor 12.

The camera device 11 acquires monitoring images at consecutive times in a room and sends the monitoring images to the processor 12.

In some implementations, the camera device 11 may be but is not limited to a hemispherical camera, a high-speed spherical camera, an integrated camera and the like.

The sound acquisition device 13 acquires a sound signal and sends the signal to the processor 12.

In some implementations, the sound acquisition device 13 may be, but is not limited to, a pickup.

The processor 12 sends a prompting instruction to the prompt device 14.

The processor 12 may be an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, or other electronic components.

When the prompting instruction is an instruction for controlling the prompt device 14 to perform voice broadcast, the prompt device 14 may be a microphone. When the prompting instruction is an instruction for controlling the prompt device 14 to display an image, the prompt device 14 may be a display screen.

Figure 2:
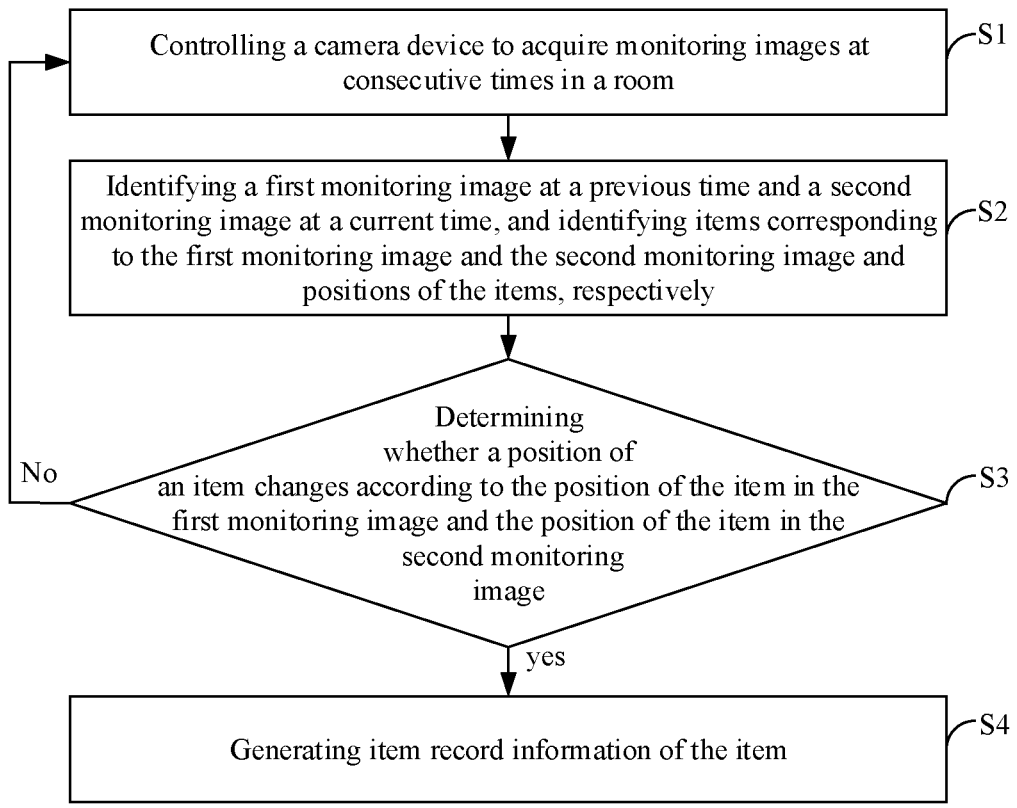
FIG. 2 is a schematic flowchart of an indoor monitoring method provided by an embodiment of the disclosure.

The embodiment also provides an indoor monitoring method, and FIG. 2 is a flow diagram of an indoor monitoring method provided by the embodiment of the disclosure. It should be noted that the indoor monitoring method provided by the embodiments of the disclosure is not limited to the specific order of FIG. 2 and described below, and it should be understood that in other embodiments, the order of some steps of the indoor monitoring method provided by the embodiments of the present disclosure may be changed according to actual needs, or some steps may be omitted or deleted. This process can be performed by the corresponding processor 12 in FIG. 1, and the specific process in FIG. 2 will be described below. As shown in FIG. 2, the method includes the following steps S1 to S4.

In step S1, a camera device is controlled to acquire monitoring images at consecutive times in a room.

Herein, images are acquired at multiple consecutive times to obtain multiple monitoring images. The time interval between the times is the same, for example, the time interval is 1 minute. If multiple consecutive times are four consecutive times, the four consecutive times can be 9:00, 9:01, 9:02 and 9:03.

In some implementations, the monitoring image can be a panoramic image.

In step S2, a first monitoring image at a previous time and a second monitoring image at a current time are identified, and items corresponding to the first monitoring image and the second monitoring image and positions of the items are identified respectively.

It can be understood that the first monitoring image and the second monitoring image are any two adjacent monitoring images of the multiple monitoring images.

In some implementations, an image recognition algorithm is used to identify the first monitoring image (for example, the monitoring image acquired at 9:00), and the item (for example, the key) corresponding to the first monitoring image and the location of the item (for example, the location of the key is a coffee table) are obtained. The image recognition algorithm may be, but is not limited to, a depth image detection algorithm.

Similarly, an image recognition algorithm is used to identify the second monitoring image (for example, the monitoring image acquired at 9:01), and the item (which is a key) corresponding to the second monitoring image and the location of the article (for example, the location of the key is a sofa) are obtained.

In step S3, it is determined whether a position of an item changes according to the position of the item in the first monitoring image and the position of the item in the second monitoring image.

Combined with the example in step S2, the position of the key in the first monitoring image is the coffee table, and the position of the key in the second monitoring image is the sofa, then it is determined that the position of the item changes, and the process goes to step S4; if the position of the key in the first monitoring image is the coffee table and the position in the second monitoring image is also the coffee table, it is determined that the position of the item does not change, and the process returns to step S1 so that the monitoring images are continued to be acquired.

In step S4, item record information is generated, wherein the item record information represents movement of the item in the room.

Herein, the item record information includes at least an initial position of the item, a current position of the item and an item name, wherein the initial position of the item is a position of the item identified according to the first monitoring image, and the current position of the item is a position of the item identified according to the second monitoring image.

In some implementations, the item record information further includes a time when the item is in the corresponding monitoring image, for example, for the second monitoring image, the item record information further includes a time corresponding to the second monitoring image, i.e. a current time (9:00 in this embodiment).

The embodiment provides an indoor monitoring method. The method includes: controlling a camera device to acquire monitoring images at consecutive times in a room; identifying a first monitoring image at a previous time and a second monitoring image at a current time, and identifying items corresponding to the first monitoring image and the second monitoring image and positions of the items, respectively; determining whether a position of an item changes according to the position of the item in the first monitoring image and the position of the item in the second monitoring image; and generating item record information of the item when it is determined that the position of the item changes, wherein the item record information represents movement of the item in the room. In this way, the item record information helps the user to record the relevant information of the item, so as to ensure that the user can quickly find the corresponding item.

Second Embodiment

Figure 3:
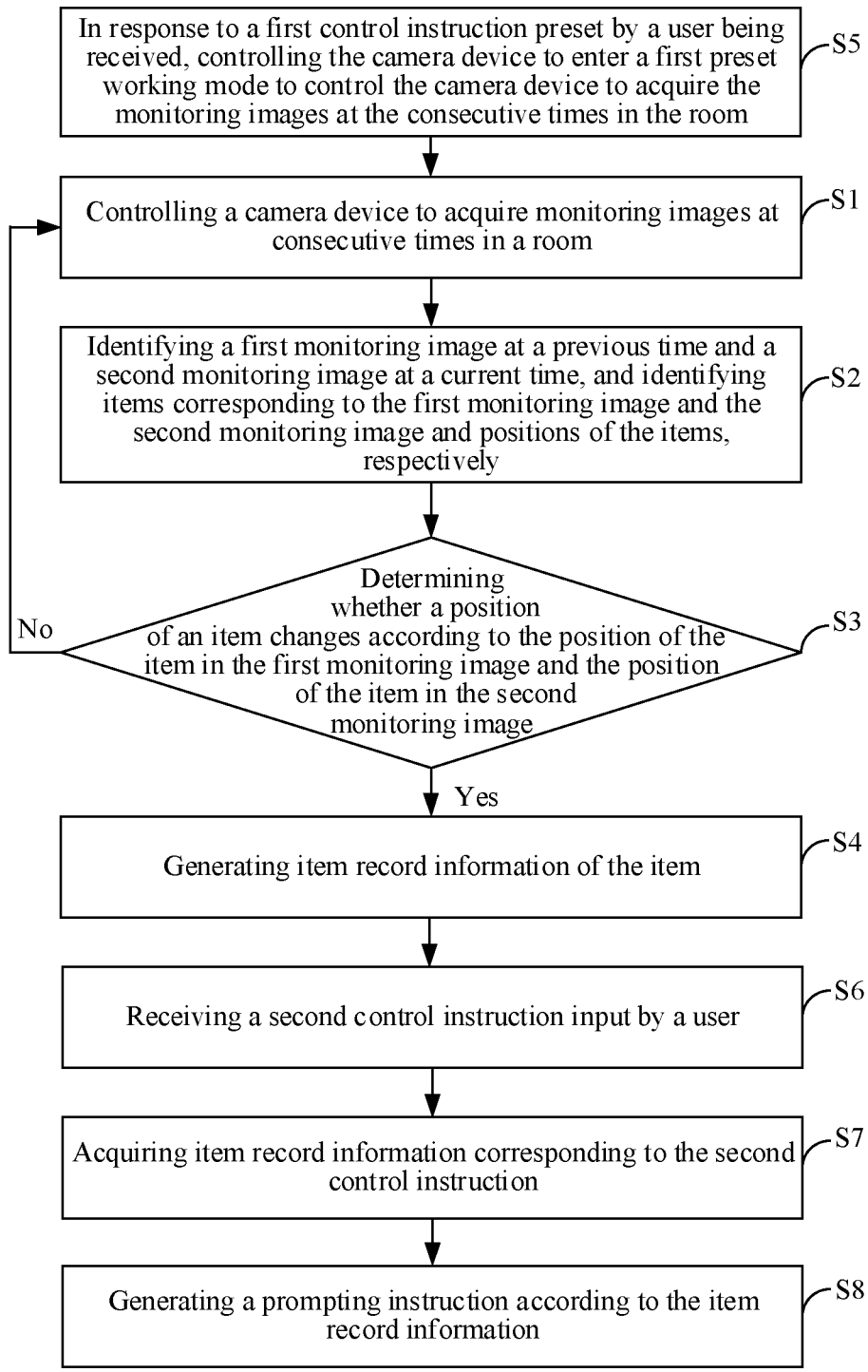
FIG. 3 is another schematic flowchart of an indoor monitoring method provided by an embodiment of the present disclosure.

On the basis of the previous embodiment, the embodiment also provides an indoor monitoring method, which is convenient for users to search for indoor items. In particular, FIG. 3 is another schematic flowchart of an indoor monitoring method provided by the embodiment of the disclosure. As shown in FIG. 3, before step S1, the method further includes the following steps S5 to S8.

In step S5, in response to a first control instruction preset by a user being received, the camera device is controlled to enter a first preset working mode to control the camera device to acquire the monitoring images at the consecutive times in the room.

Herein, the first control instruction can be an instruction preset by a user. In some implementations, the first control instruction may be an instruction set at 18:00 every day to control the camera device to enter a first preset working mode. The first preset working mode can be set as a user home mode, specifically, the mode is to control the camera device to enter the first preset working mode when the user is at home.

It should be noted that the time when the camera device is controlled to enter the first preset working mode can be set according to the actual situation of the user, for example, according to the time when the user arrives home from work, and is not limited to 18:00 every day in the above example.

When the room is chaotic, it is difficult for a user to find the item; or the user forgets the placement position of the item. In order to help the user find the item quickly, after step S4, the method further includes steps S6 to S8.

In step S6, a second control instruction input by a user is received, wherein the second control instruction comprises a search request for searching for an item.

Herein, the second control instruction is an instruction for searching for the item.

In step S7, item record information corresponding to the second control instruction is acquired.

Description is made by further taking the key as the item. According to the second control instruction input by the user, for example, the voice or texts "Where is my key?" input by the user through a voice input device or through a touch screen, the second control instruction is generated according to the input content of the user to obtain an item information record corresponding to the key. For example, the item information record can be: the key is moved from the coffee table to the sofa at 9:01.

In step S8, a prompting instruction is generated according to the item record information.

In some implementations, the generated prompting instruction controls the prompt device in FIG. 1 to perform voice playback or video playback for prompting.

In this embodiment, the item is searched according to the item information, so that the user can quickly find the item, and the difficulty in searching for the item is reduced.

Third Embodiment

Figure 4:
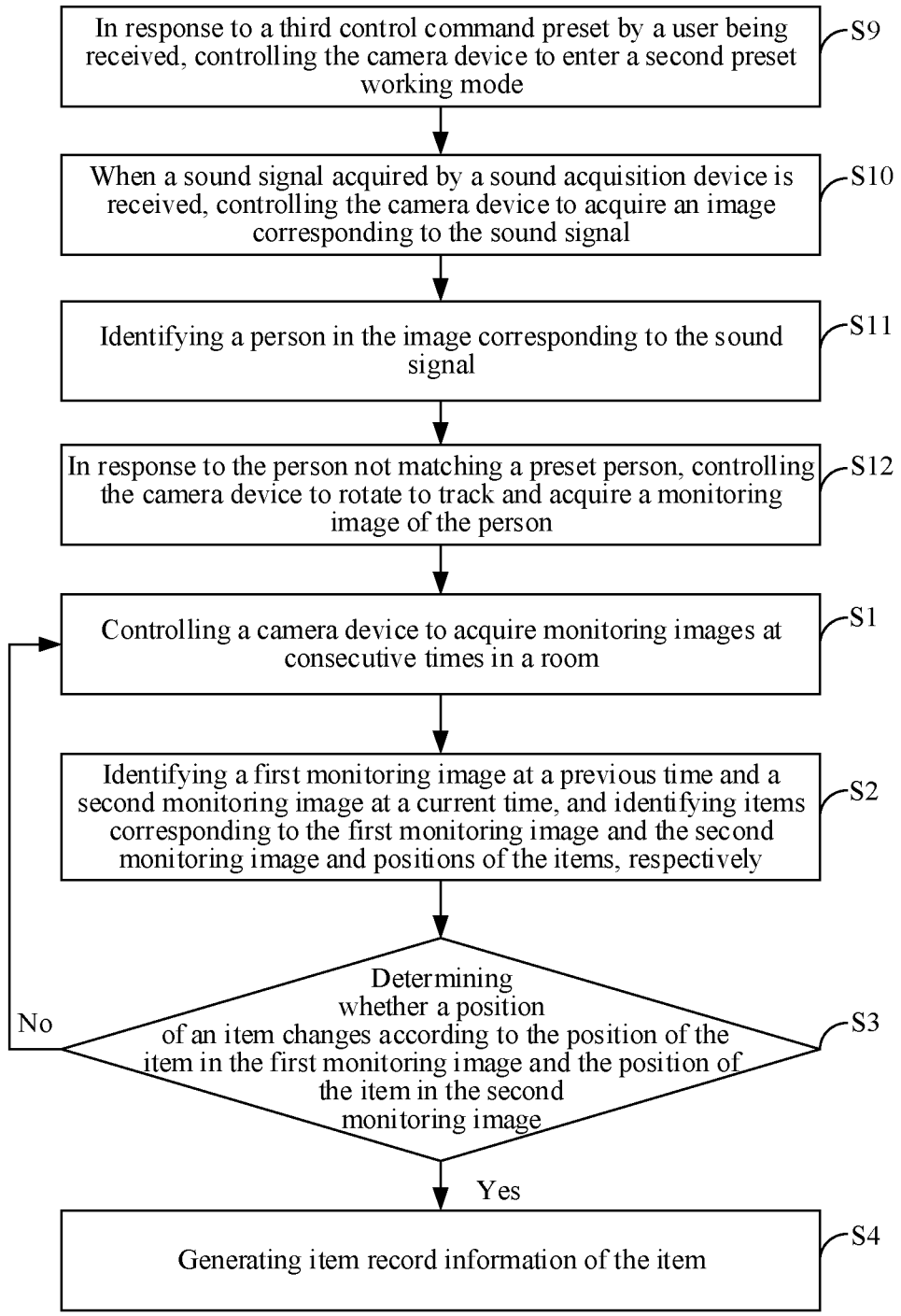
FIG. 4 is another schematic flowchart of an indoor monitoring method provided by an embodiment of the present disclosure.

In the present disclosure, in addition to the first preset working mode (home mode) set in the second embodiment, a second preset working mode (leaving-home mode) can also be set. Specifically, FIG. 4 is another flow diagram of an indoor monitoring method provided by the embodiment of the present disclosure. As shown in FIG. 4, before step S1, the method further comprises the following steps.

In step S9, in response to a third control command preset by a user being received, the camera device is controlled to enter a second preset working mode.

Herein, the second control instruction can be an instruction preset by a user. In some implementations, the second control instruction may be an instruction set at 09:00 every day to control the camera device to enter a second preset working mode. The second preset working mode can be set as a user leaving home mode, specifically, the mode is to control the camera device to enter the second preset working mode when the user leaves home.

In step S10, when a sound signal acquired by a sound acquisition device is received, the camera device is controlled to acquire an image corresponding to the sound signal.

In a possible implementation, when the sound acquisition device does not receive the sound signal in the leaving-home mode, the camera device is controlled to be in a turned-off or standby state, so that the purpose of energy saving can be achieved on one hand, and the waste of storage space caused by unnecessary images acquired by the camera device can be avoided on the other hand. It can be appreciated that when the user is not at home and no person enters, if multiple frames of images acquired by the camera device are the same, the acquired images in this case are considered unnecessary images. When the sound signal is received, it is indicated that the user is not at home but someone enters, and the camera device is turned on and controlled to acquire images.

In another possible implementation, In the leaving-home mode, the camera device is controlled to acquire images at a larger preset time interval (e.g. 30 minutes), and after the sound signal is acquired by the sound acquisition device, the camera device is controlled to acquire images at a smaller time interval (e.g. 1 minute or 10 seconds), so as to ensure that as many images of the person can be acquired as possible.

In step S11, a person in the image corresponding to the sound signal is identified.

For example, face recognition algorithm is used to recognize the facial features of the person.

In step S12, in response to the person not matching a preset person, the camera device is controlled to rotate to track the person and acquire monitoring images of the person.

Herein, the preset person can be an owner of a house, and there may be multiple present persons.

If the person does not match the preset person, which means that someone other than the owner enters after the user leaves home, the camera device is controlled to rotate to track the person and acquire monitoring images of the person, so as to implement monitoring of the person.

Figure 5:
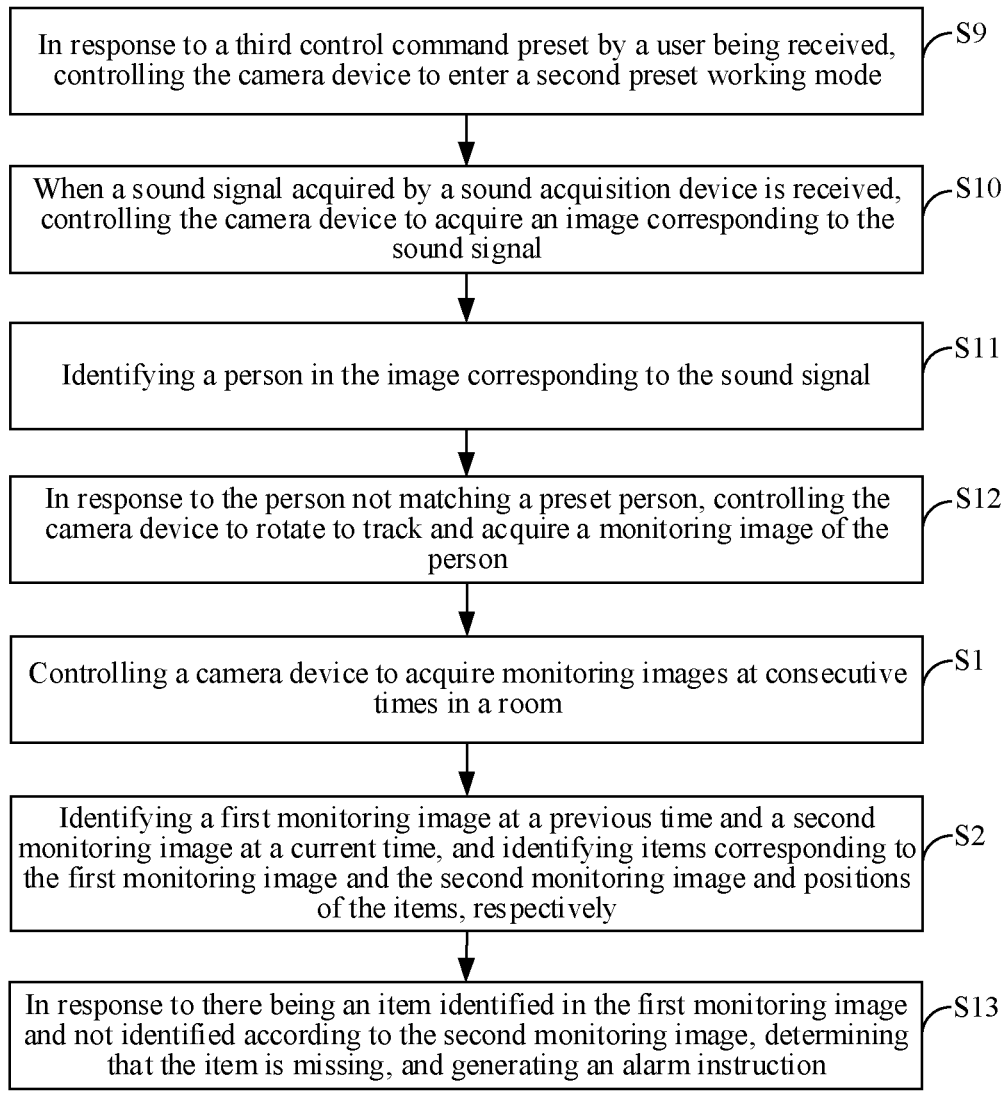
FIG. 5 is another schematic flowchart of an indoor monitoring method provided by an embodiment of the present disclosure.

FIG. 5 is another schematic flowchart of an indoor monitoring method provided by an embodiment of the present disclosure. As shown in FIG. 5, after the step S3, the method further includes the following step.

In step S13, in response to there being an item identified in the first monitoring image and not identified according to the second monitoring image, it is determined that the item is missing, and an alarm instruction is generated.

Herein, the alarm instruction can control the prompt device to give voice or video alarm. Communication devices (such as telephones) can also be controlled to make calls to call the police.

In the embodiment, when the sound acquisition device does not receive the sound signal in the leaving-home mode, the camera device is controlled to be in a turned-off or standby state, so that the purpose of energy saving can be achieved on one hand, and the waste of storage space caused by unnecessary images acquired by the camera device can be avoided on the other hand. When the sound signal is received, it means that the user is not at home but someone enters, then the camera device is turned on and controlled to acquire images. If the person does not match the preset person, which means that someone other than the owner enters after the user leaves home, the camera device is controlled to rotate to track the person and acquire monitoring images of the person, so as to implement monitoring of the person and calling of the police.

Fourth Embodiment

Figure 6:
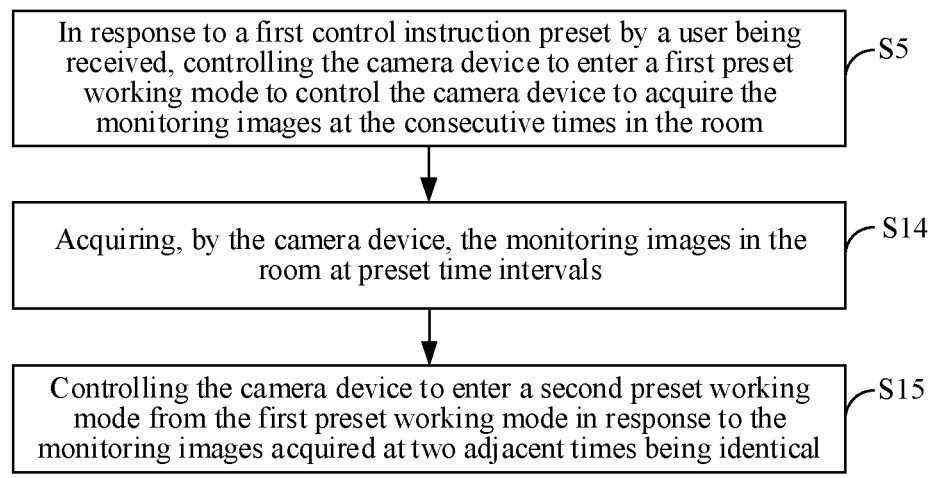
FIG. 6 is another schematic flowchart of an indoor monitoring method provided by an embodiment of the present disclosure.

The embodiment provides an indoor monitoring method. If a user forgets to set a second preset working mode (leaving-home mode) when the user leaves home, and automatic switching from the first preset working mode (home mode) to the second preset working mode (leaving-home mode) is performed, thus avoiding the waste of electric energy and storage space. FIG. 6 is another schematic flowchart of an indoor monitoring method provided by an embodiment of the present disclosure. As shown in FIG. 6, after the step S5, the method further includes the following steps.

In step S14, the camera device acquires the monitoring images in the room at preset time intervals.

For example, the preset time interval in this embodiment may be 1 minute.

In step S15, the camera device is controlled to enter a second preset working mode from the first preset working mode in response to the monitoring images acquired at two adjacent times being identical.

When two adjacent detection images acquired are identical, it indicates that there is no person movement in the images, which means that the user is away from home.

Therefore, the camera device is controlled to enter the second working mode.

Compared with the related art, one or more embodiments of the above scheme may have the following advantages or beneficial effects.

(1) The method includes: controlling a camera device to acquire monitoring images at consecutive times in a room; identifying a first monitoring image at a previous time and a second monitoring image at a current time, and identifying items corresponding to the first monitoring image and the second monitoring image and positions of the items, respectively; determining whether a position of an item changes according to the position of the item in the first monitoring image and the position of the item in the second monitoring image; and generating item record information of the item when it is determined that the position of the item changes, wherein the item record information represents movement of the item in the room. In this way, the item record information helps the user to record the relevant information of the item, so as to ensure that the user can quickly find the corresponding item.

(2) The item is searched according to the item information, so that the user can quickly find the item, and the difficulty in searching for the item is reduced.

(3) When the sound acquisition device does not receive the sound signal in the leaving-home mode, the camera device is controlled to be in a turned-off or standby state, so that the purpose of energy saving can be achieved on one hand, and the waste of storage space caused by unnecessary images acquired by the camera device can be avoided on the other hand. When the sound signal is received, it means that the user is not at home but someone enters, then the camera device is turned on and controlled to acquire images. If the person does not match the preset person, which means that someone other than the owner enters after the user leaves home, the camera device is controlled to rotate to track the person and acquire monitoring images of the person, so as to implement monitoring of the person and calling of the police.

Fifth Embodiment

Figure 7:
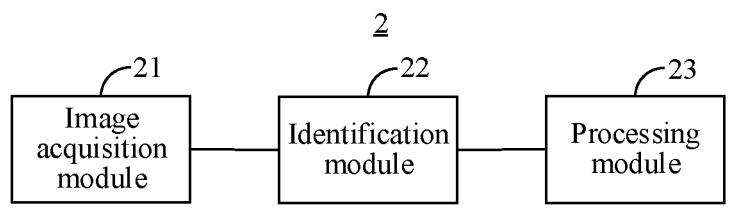
FIG. 7 is a connection block diagram of an indoor monitoring device provided by an embodiment of the disclosure.

FIG. 7 is a connection block diagram of an indoor monitoring device provided by an embodiment of the disclosure. As shown in FIG. 7, the indoor monitoring device 2 includes an image acquisition module 21, an identification module 22 and a processing module 23.

The image acquisition module 21 is configured to control a camera device to acquire monitoring images at consecutive times in a room.

It can be understood that the image acquisition module 21 may be configured to perform the step S1.

The identification module 22 is configured to identify a first monitoring image at a previous time and a second monitoring image at a current time, and identify items corresponding to the first monitoring image and the second monitoring image and positions 23 of the items, respectively.

It can be understood that the identification module 22 may be configured to perform the step S2.

The processing module 23 is configured to: determine whether a position of an item changes according to the position of the item in the first monitoring image and the position of the item in the second monitoring image, and generate item record information of the item when it is determined that the position of the item changes, where the item record information represents movement of the item in the room.

It can be understood that the processing module 23 may be configured to perform steps S3 and S4 described above.

Those skilled in the art will clearly appreciate that, for convenience and conciseness of description, the specific operation processes of the image acquisition module 21, the identification module 22 and the processing module 23 may refer to the corresponding processes in the aforementioned method embodiments and will not be repeated herein.

Sixth Embodiment

The present embodiment provides an indoor monitoring system. As shown in FIG. 1 the indoor monitoring system 1 includes a camera device 11 and a processor 12.

The camera device 11 is electrically connected with the processor 12, and configured to acquire monitoring images at consecutive times in a room and send the monitoring images to the processor 12.

The processor 12 is configured to: control a camera device to acquire monitoring images at consecutive times in a room; identify a first monitoring image at a previous time and a second monitoring image at a current time, and identify items corresponding to the first monitoring image and the second monitoring image and positions of the items, respectively; determine whether a position of an item changes according to the position of the item in the first monitoring image and the position of the item in the second monitoring image; and generate item record information of the item when it is determined that the position of the item changes, where the item record information represents movement of the item in the room.

In some implementations, the indoor monitoring system 1 further includes a sound acquisition device 13.

The sound acquisition device 13 is electrically connected with the processor 12, and configured to acquire a sound signal and send the signal to the processor.

The processor 12 is configured to, when the sound signal acquired by the sound acquisition device is received, control the camera device to acquire an image corresponding to the sound signal.

In some implementations, the indoor monitoring system 1 further includes a prompt device 14.

The prompt device 14 is electrically connected to the processor 12, and configured to receive and execute a prompting instruction from the processor 12.

Those skilled in the art will clearly appreciate that, for convenience and conciseness of description, the specific operation processes of the camera device 11, the processor 12, the sound acquisition device 13 and the prompt device 14 may refer to the corresponding processes in the aforementioned method embodiments and will not be repeated herein.

Seventh Embodiment

The present embodiment further provides a storage medium having stored thereon a computer program that, when executed by one or more processors, causes the processors to perform the indoor monitoring method according to any one of the first to the fourth embodiments.

The storage medium may be flash memory, hard disk, multimedia card, card type memory (e.g. SD or DX memory, etc.), random access memory (RAM), static random access memory (SRAM), read only memory (ROM), electrically erasable programmable read only memory (EEPROM), programmable read only memory (PROM), magnetic memory, magnetic disk, optical disk, server, application (APP) store, etc.

Eighth Embodiment

The present embodiment further provides a camera device, including a processor and a memory having stored thereon a computer program, wherein when the computer program is executed by the processor, the indoor monitoring method according to any one of the first to the fourth embodiments is performed.

It should be noted that in the first embodiment, the camera device is configured to acquire multiple monitoring images and send acquired monitoring images to a separate processor for identification. The camera device provided in this embodiment integrates a processor, which can directly identify the acquired images.

The processor may be an application specific integrated circuit ASIC, a digital signal processor DSP, a digital signal processing device called DSPD, a programmable logic device PLD, a field programmable gate array FPGA, a controller, a microcontroller, a microprocessor or other electronic component implementation arranged to perform the indoor monitoring method according to any one of the first to the fourth embodiments.

The memory may be implemented by any type of volatile or nonvolatile storage device or a combination thereof, For example, Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk.

To sum up, the disclosure provides an indoor monitoring method, device and system, a storage medium and a camera device. The method includes: controlling a camera device to acquire monitoring images at consecutive times in a room; identifying a first monitoring image at a previous time and a second monitoring image at a current time, and identifying items corresponding to the first monitoring image and the second monitoring image and positions of the items, respectively; determining whether a position of an item changes according to the position of the item in the first monitoring image and the position of the item in the second monitoring image; and generating item record information of the item when it is determined that the position of the item changes, wherein the item record information represents movement of the item in the room. In this way, the item record information helps the user to record the relevant information of the item, so as to ensure that the user can quickly find the corresponding item.

In the embodiments provided in the present disclosure it should be understood that the disclosed apparatus and method may be implemented in other ways as well. The apparatus embodiments described above are only illustrative, for example, the flowcharts and block diagrams in the drawings show the architecture, functions, and operations of possible implementations of the apparatus, methods, and computer program products according to various embodiments of the present disclosure. In this regard, each block in a flow chart or block diagram may represent a module, program segment or part of code containing one or more executable instructions arranged to perform a specified logical function. It should also be noted that in some alternative implementations the functions indicated in the boxes may also occur in a different order than those indicated in the drawings. For example, two successive boxes can actually be executed substantially in parallel, or they can sometimes be executed in reverse order, depending on the functionality involved. It is also noted that each block in the block diagram and/or flow chart, and combinations of the blocks in the block diagram and/or flow chart, may be implemented in a dedicated hardware-based system that performs a specified function or action, or may be implemented in a combination of dedicated hardware and computer instructions.

It should be noted that, In the present disclosure, The terms "including", "including" or any other variation thereof are intended to encompass non-exclusive inclusion, so that a process, method, article or equipment that includes a set of elements includes not only those elements but also other elements that are not explicitly listed, or also elements inherent to such a process, method, article or equipment. In the absence of further limitations, the elements defined by the phrase "include an . . . " do not exclude the existence of other identical elements in the process, method, article or equipment in which the elements are included.

Although the implementation rights disclosed in the present disclosure are as described above the above contents are used only for the convenience of understanding the implementation rights of the present disclosure and are not intended to limit the present disclosure. Any technician in the technical field to which this disclosure belongs may make any modification and change in the form and details of implementation without departing from the spirit and scope disclosed in this disclosure, but the scope of patent protection of this disclosure shall still be subject to the scope defined in the appended claims.

The invention claimed is:

1. An indoor monitoring method, comprising:
receiving, by a monitoring system, a first control instruction preset by a user;
in response to receiving the first control instruction preset, operating the monitoring system according to a first preset working mode, wherein operating the monitoring system according to the first preset working mode comprises:
controlling a camera device of the monitoring system to acquire monitoring images at consecutive times in a room;
identifying a first monitoring image at a previous time and a second monitoring image at a current time, and identifying items corresponding to the first monitoring image and the second monitoring image and positions of the items, respectively;
determining whether a position of a first item of the items changes according to the position of the first item in the first monitoring image and the position of the first item in the second monitoring image; and
generating item record information of the first item when it is determined that the position of the first item changes, wherein the item record information represents movement of the first item in the room;
receiving, by the monitoring system, a second control instruction preset by the user;
in response to receiving the second control instruction preset, operating the monitoring system according to a second preset working mode, wherein operating the monitoring system according to the second preset working mode comprises:
receiving a sound signal from a sound acquisition device of the monitoring system;
in response to receiving the sound signal, controlling the camera device to acquire an image corresponding to the sound signal;
identifying a person in the image corresponding to the sound signal;
determining that the person does not match a preset person; and
in response to determining that the person does not match the preset person, controlling the camera device to rotate to track the person and acquire monitoring images of the person.

2. The indoor monitoring method according to claim 1, wherein the item record information comprises at least an initial position of the first item, a current position of the first item and an item name, wherein the initial position of the first item is a position of the first item identified according to the first monitoring image, and the current position of the first item is a position of the first item identified according to the second monitoring image.

3. The indoor monitoring method according to claim 1, further comprising:
after generating the item record information of the first item when it is determined that the position of the first item changes;
receiving a third control instruction input by the user, wherein the third control instruction comprises a search request for searching for the first item;
acquiring the item record information corresponding to the second control instruction; and
generating a prompting instruction according to the item record information.

4. The indoor monitoring method according to claim 1, further comprising:
in response to there being a second item identified in the first monitoring image and not identified according to the second monitoring image, determining that the second item is missing, and generating an alarm instruction.

5. The indoor monitoring method according to claim 1, further comprising:
in response to receiving the first control instruction preset by the user:
acquiring, by the camera device, the monitoring images in the room at preset time intervals; and
controlling the camera device to enter the second preset working mode from the first preset working mode in response to the monitoring images acquired at two adjacent times being identical.

6. An indoor monitoring system, comprising:
a camera device, a sound acquisition device, and a processor,
wherein the camera device and the sound acquisition device are electrically connected with the processor and wherein the processor is configured to:
receive a first control instruction preset by a user;
in response to receiving the first control instruction preset, cause the monitoring system to operate according a first preset working mode, wherein causing the monitoring system to operate according the first preset working mode comprises:
controlling the camera device to acquire monitoring images at consecutive times in a room;
identifying a first monitoring image at a previous time and a second monitoring image at a current time, and identifying items corresponding to the first monitoring image and the second monitoring image and positions of the items, respectively; and
determiningwhether a position of a first item of the items changes according to the position of the first item in the first monitoring image and the position of the first item in the second monitoring image; and
generating item record information of the first item when it is determined that the position of the first item changes, wherein the item record information represents movement of the first item in the room; and
receive a second control instruction preset by the user;
in response to receiving the second control instruction preset, cause the monitoring system to operate according a second preset working mode, wherein causing the monitoring system to operate according the second preset working mode comprises:
receiving a sound signal from the sound acquisition device;
in response to receiving the sound signal, controlling the camera device to acquire an image corresponding to the sound signal;
identifying a person in the image corresponding to the sound signal;
determining that the person does not match a preset person; and
in response to determining that the person does not match the preset person, controlling the camera device to rotate to track the person and acquire monitoring images of the person.

7. A non-transitory storage medium having stored thereon computer program instructions that, when executed by one or more processors, cause the processors to perform operations of:
receiving, by a monitoring system, a first control instruction preset by a user;
in response to receiving the first control instruction preset, operating the monitoring system according to a first preset working mode, wherein operating the monitoring system according to the first preset working mode comprises:
controlling a camera device of the monitoring system to acquire monitoring images at consecutive times in a room;
identifying a first monitoring image at a previous time and a second monitoring image at a current time, and identifying items corresponding to the first monitoring image and the second monitoring image and positions of the items, respectively;
determining whether a position of a first item of the items changes according to the position of the first item in the first monitoring image and the position of the first item in the second monitoring image; and
generating item record information of the first item when it is determined that the position of the first item changes, wherein the item record information represents movement of the first item in the room,
receiving, by the monitoring system, a second control instruction preset by the user;
in response to receiving the second control instruction preset, operating the monitoring system according to a second preset working mode, wherein operating the monitoring system according to the second preset working mode comprises:

receiving a sound signal from a sound acquisition device of the monitoring system;

in response to receiving the sound signal, controlling the camera device to acquire an image corresponding to the sound signal;

identifying a person in the image corresponding to the sound signal;

determining that the person does not match a preset person; and in response to determining that the person does not match the preset person, controlling the camera device to rotate to track the person and acquire monitoring images of the person.

8. The system according to claim 6, wherein the item record information comprises at least an initial position of the first item, a current position of the first item and an item name, wherein the initial position of the first item is a position of the first item identified according to the first monitoring image, and the current position of the first item is a position of the first item identified according to the second monitoring image.

9. The system according to claim 8, wherein the processor is further configured to:

after generating the item record information of the first item when it is determined that the position of the first item changes:

receive a third control instruction input by a user, wherein the third control instruction comprises a search request for searching for the first item;

acquire item record information corresponding to the second control instruction; and generate a prompting instruction according to the item record information.

10. The system according to claim 6, wherein the processor is further configured to:

in response to there being a second item identified in the first monitoring image and not identified according to the second monitoring image, determine that the second item is missing, and generating an alarm instruction.

11. The system according to claim 7, wherein the processor is further configured to:

in response to receiving the first control instruction preset by the user:

control the camera device to acquire the monitoring images in the room at preset time intervals; and control the camera device to enter the second preset working mode from the first preset working mode in response to the monitoring images acquired at two adjacent times being identical.

* * * * *